US010023405B2

(12) United States Patent
Kim et al.

(10) Patent No.: US 10,023,405 B2
(45) Date of Patent: Jul. 17, 2018

(54) AUTOMATIC INFEED TIPPER, AND APPARATUS AND METHOD FOR CONTROLLING AUTOMATIC INFEED TIPPER

(71) Applicant: Electronics and Telecommunications Research Institute, Daejeon (KR)

(72) Inventors: Ki-Hak Kim, Sejong-si (KR); Woo-Jin Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 15/448,987

(22) Filed: Mar. 3, 2017

(65) Prior Publication Data

US 2018/0022558 A1    Jan. 25, 2018

(30) Foreign Application Priority Data

Jul. 22, 2016    (KR) .......................... 10-2016-0093204

(51) Int. Cl.
| | | |
|---|---|---|
| B65G 65/23 | (2006.01) | |
| B65G 57/28 | (2006.01) | |
| B65G 7/08 | (2006.01) | |
| B65G 15/24 | (2006.01) | |
| B65G 47/40 | (2006.01) | |
| B65G 47/30 | (2006.01) | |
| B65G 47/31 | (2006.01) | |
| B65G 47/04 | (2006.01) | |

(52) U.S. Cl.
CPC .............. *B65G 65/23* (2013.01); *B65G 7/08* (2013.01); *B65G 15/24* (2013.01); *B65G 47/04* (2013.01); *B65G 47/30* (2013.01); *B65G 47/31* (2013.01); *B65G 47/40* (2013.01); *B65G 57/28* (2013.01)

(58) Field of Classification Search
CPC ........ B65G 47/40; B65G 65/23; B65G 57/28; B65G 7/08
See application file for complete search history.

(56) References Cited

U.S. PATENT DOCUMENTS 4,802,810 A * 2/1989 Gunn ..................... B65G 59/08
                                                                                       414/414
5,092,451 A * 3/1992 Jones ..................... B65G 43/08
                                                                                       198/444

(Continued)

FOREIGN PATENT DOCUMENTS

DE      102009033455 A1 *  9/2010    ......... B65G 47/1492
EP           0952101 A2    10/1999

(Continued)

*Primary Examiner* — Thomas Randazzo
(74) *Attorney, Agent, or Firm* — William Park & Associates Ltd.

(57) ABSTRACT

Disclosed herein are an automatic infeed tipper and an apparatus and method for controlling the automatic infeed tipper. The apparatus for controlling an automatic infeed tipper includes an article infeed control unit for allowing a pallet loaded with multiple articles to be installed on the tipper and controlling an angle of the tipper so that the articles loaded onto the pallet are fed into a conveyor unit, and a conveyor control unit for sequentially driving a transport conveyor belt and a plurality of tipper-use conveyor belts, which are provided in the conveyor unit, so as to disperse the articles fed into the conveyor unit.

20 Claims, 10 Drawing Sheets

(56) References Cited

U.S. PATENT DOCUMENTS

| | | | | |
|---|---|---|---|---|
| 6,311,822 B1* | 11/2001 | LeCroy | ............... | B65G 47/31 |
| | | | | 198/347.1 |
| 6,471,044 B1* | 10/2002 | Isaacs | ............... | B65G 43/08 |
| | | | | 198/347.4 |
| 9,221,572 B2* | 12/2015 | Scagliola | ............... | B07C 1/04 |
| 9,527,679 B2* | 12/2016 | Neiser | ............... | B65G 47/26 |
| 9,790,035 B2* | 10/2017 | Neiser | ............... | B65G 43/10 |
| 2002/0046923 A1* | 4/2002 | Herubel | ............... | B65G 47/31 |
| | | | | 198/444 |
| 2003/0210978 A1* | 11/2003 | Smets | ............... | B65G 25/10 |
| | | | | 414/798.9 |
| 2004/0022608 A1* | 2/2004 | Lilley | ............... | B65G 65/23 |
| | | | | 414/356 |
| 2007/0012603 A1 | 1/2007 | Park et al. | | |
| 2007/0246328 A1* | 10/2007 | Reznik | ............... | B65G 43/10 |
| | | | | 198/444 |
| 2012/0114834 A1 | 5/2012 | Kim et al. | | |
| 2015/0314965 A1* | 11/2015 | Churchill | ............... | B65G 37/00 |
| | | | | 198/382 |

FOREIGN PATENT DOCUMENTS

| | | | |
|---|---|---|---|
| KR | 1019990083122 A | 11/1999 | |
| KR | 1020050107514 A | 11/2005 | |
| KR | 1020100126435 A | 12/2010 | |
| KR | 1020130071262 A | 6/2013 | |
| WO | 2004080850 A2 | 9/2004 | |
| WO | 2009114332 A2 | 9/2009 | |

* cited by examiner

AUTOMATIC INFEED TIPPER, AND APPARATUS AND METHOD FOR CONTROLLING AUTOMATIC INFEED TIPPER

CROSS REFERENCE TO RELATED APPLICATION

This application claims the benefit of Korean Patent Application No. 10-2016-0093204, filed Jul. 22, 2016, which is hereby incorporated by reference in its entirety into this application.

BACKGROUND OF THE INVENTION

1. Technical Field

The present invention relates generally to technology for automatically processing articles that are fed into an article sorter and, more particularly, to technology that is capable of aligning articles without causing a bottleneck by sequentially controlling the acceleration and deceleration of a transport conveyor belt and a plurality of tipper-use conveyor belts.

2. Description of the Related Art

With the development of mobile and Internet shopping, the quantity of articles to be delivered via delivery service is increasing every year. Further, in order to efficiently sort articles to be delivered, article sorting systems are frequently and widely used in mail distribution centers or private logistics centers.

Recently, new sorters, such as a cross-belt type and an E-tray type, have been developed and commercialized. Further, articles from large articles to small articles can be sorted at high speed. In particular, since articles are sorted at high speed, it is impossible to keep up with the sorting speed of a high-speed article sorter when a human being feeds articles. Accordingly, in Europe, in order to reduce the workload imposed on a worker and improve processing speed, there is a growing tendency for all portions into which articles are fed to be automated.

Most devices used for automatic infeed include a tipper and a singulator. In the case of a conventional tipper, a problem arises in that, in the state in which the tipper is tilted at an angle of 120° or more, multiple articles are poured into an infeed space at the same time, and thus the articles may be damaged. Recently, in Europe, in order to minimize damage to articles, a tipper-use conveyor belt, moving at an angle identical to that of a pallet and a container, has been developed, and thus damage to articles can be remarkably reduced.

A singulator is a device for aligning bundles of articles that are fed from the tipper, and the length of the singulator ranges from a minimum of 6.5 m to a maximum of 20 m depending on the manufacturing company thereof. In the case of European logistics centers, since the infeed space is wide, and it is possible to secure sufficient lengths of a conveyor and a singulator for aligning bundles of articles poured from a tipper, there is no need to apply technology for controlling the tipper. That is, a long infeed conveyor belt, acting as a buffer, is present, and thus it does not matter if bundles of articles are poured at the same time from the tipper and then shifted to the infeed conveyor belt and to the singulator.

However, when the space of a logistics center is small, a long infeed conveyor belt cannot be installed. Accordingly, when bundles of articles are poured at the same time from the tipper and are fed into an infeed space, it is not easy to align the bundles of articles that are fed using a short conveyor belt and a short singulator.

Therefore, there is required the development of technology for controlling an automatic infeed tipper so that the automatic infeed tipper can also be applied to a short conveyor belt and a short singulator.

PRIOR ART DOCUMENTS

Patent Documents (Patent Document) Korean Patent Application No. 10-1999-0012719 (Date of Publication: Nov. 25, 1999, entitled "Method and Apparatus For High Speed Article Processing")

SUMMARY OF THE INVENTION

Accordingly, the present invention has been made keeping in mind the above problems occurring in the prior art, and an object of the present invention is to apply an automatic infeed device to a logistics center having a small space.

Another object of the present invention is to reduce the workload imposed on a worker who conducts an infeed task.

A further object of the present invention is to align articles without causing a bottleneck in a short infeed conveyor and a short singulator device.

In accordance with an aspect of the present invention to accomplish the above objects, there is provided an apparatus for controlling an automatic infeed tipper, including an article infeed control unit for allowing a pallet loaded with multiple articles to be installed on the tipper, and controlling an angle of the tipper so that the articles loaded onto the pallet are fed into a conveyor unit; and a conveyor control unit for sequentially driving a transport conveyor belt and a plurality of tipper-use conveyor belts, which are provided in the conveyor unit, so as to disperse the articles fed into the conveyor unit.

The conveyor control unit may periodically increase and decrease respective driving speeds of the transport conveyor belt and the plurality of tipper-use conveyor belts.

The conveyor control unit may drive the conveyor unit so that respective maximum driving speeds of the transport conveyor belt and the plurality of tipper-use conveyor belts are different from each other.

The conveyor control unit may drive the conveyor unit so that the maximum driving speed of the transport conveyor belt is highest and a maximum driving speed of a tipper-use conveyor belt that is farthest away from the transport conveyor belt is lowest.

The conveyor control unit may set acceleration time points of the transport conveyor belt and the plurality of tipper-use conveyor belts to different values.

The conveyor control unit may set deceleration time points of the transport conveyor belt and the plurality of tipper-use conveyor belts to an identical value.

The conveyor control unit may drive the conveyor unit in conformity with both differences between operation start times of the transport conveyor belt and the plurality of tipper-use conveyor belts and operating durations of the transport conveyor belt and the plurality of tipper-use conveyor belts.

The differences between the operation start times and the operating durations may be set based on at least one of sizes of the articles fed into the conveyor unit and a density of the articles.

The apparatus may further include an image analysis unit for analyzing an image corresponding to the conveyor unit, wherein the sizes of the articles and the density of the articles are calculated based on results of analysis of the image.

The article infeed control unit may control the angle of the tipper so that the pallet and the tipper are tilted at an identical speed and at an identical angle.

The apparatus may further include an article detection unit for detecting the articles fed into the conveyor unit so as to control driving of the conveyor unit.

In accordance with another aspect of the present invention to accomplish the above objects, there is provided a method for controlling an automatic infeed tipper, the method being performed by an apparatus for controlling the automatic infeed tipper, the method including installing a pallet loaded with multiple articles on the tipper, and controlling an angle of the tipper so that the articles loaded onto the pallet are fed into a conveyor unit; sequentially driving a transport conveyor belt and a plurality of tipper-use conveyor belts, which are provided in the conveyor unit, so as to disperse the articles fed into the conveyor unit; and stopping the driving of the conveyor unit in a reverse order of a driving order in which the conveyor belts in the conveyor unit are driven.

Sequentially driving the conveyor unit may be configured to periodically increase and decrease respective driving speeds of the transport conveyor belt and the plurality of tipper-use conveyor belts.

Sequentially driving the conveyor unit may be configured to drive the conveyor unit so that respective maximum driving speeds of the transport conveyor belt and the plurality of tipper-use conveyor belts are different from each other.

Sequentially driving the conveyor unit may be configured to set acceleration time points of the transport conveyor belt and the plurality of tipper-use conveyor belts to different values and to set deceleration time points of the transport conveyor belt and the plurality of tipper-use conveyor belts to an identical value.

Sequentially driving the conveyor unit may include receiving and analyzing an image corresponding to the conveyor unit; setting differences between operation start times of the transport conveyor belt and the plurality of tipper-use conveyor belts and operating durations of the transport conveyor belt and the plurality of tipper-use conveyor belts, based on at least one of sizes of the articles fed into the conveyor unit and a density of the articles; and driving the conveyor unit in conformity with the differences between the operation start times and the operating durations.

In accordance with a further aspect of the present invention to accomplish the above objects, there is provided an automatic infeed tipper, including an article infeed unit configured to allow a pallet loaded with multiple articles to be installed thereon and to rotate at an angle identical to an angle of the pallet so that the articles, loaded onto the pallet, are fed into the article infeed unit; a conveyor unit provided with a transport conveyor belt and a plurality of tipper-use conveyor belts, and configured to transport the articles by adjusting spaces between the fed articles; and a control unit configured to control driving of the article infeed unit and control driving of the conveyor unit by sequentially accelerating and decelerating the transport conveyor belt and the plurality of tipper-use conveyor belts.

The automatic infeed tipper may further include a detection unit configured to detect the articles located in the conveyor unit, wherein the control unit controls driving of at least one of the article infeed unit and the conveyor unit based on results of detection by the detection unit.

The control unit may control the conveyor unit so that respective maximum driving speeds of the transport conveyor belt and the plurality of tipper-use conveyor belts are different from each other.

The control unit may control the conveyor unit so that respective acceleration time points of the transport conveyor belt and the plurality of tipper-use conveyor belts are different from each other and respective deceleration time points of the transport conveyor belt and the plurality of tipper-use conveyor belts are identical to each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
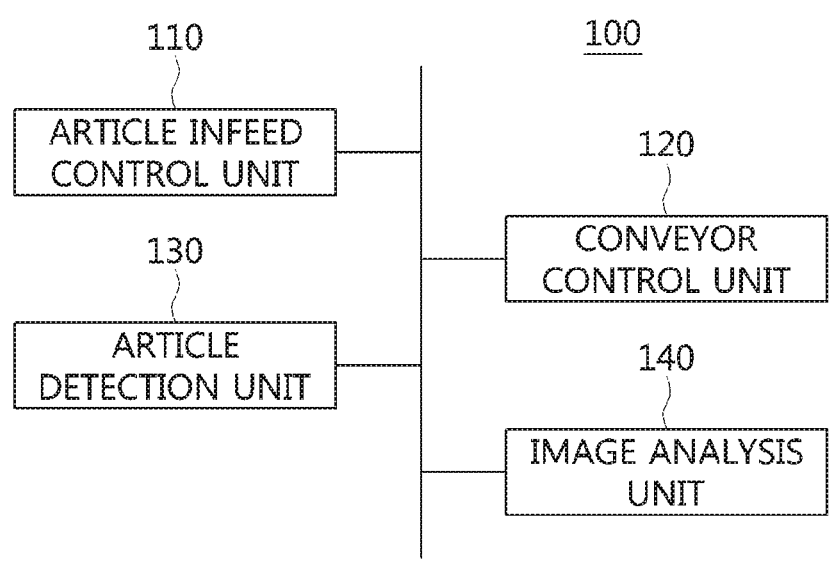
FIG. 1 is a block diagram showing the configuration of an apparatus for controlling an automatic infeed tipper according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing the configuration of an apparatus for controlling an automatic infeed tipper according to an embodiment of the present invention.

As shown in FIG. 1, an apparatus 100 for controlling an automatic infeed tipper includes an article infeed control unit 110, a conveyor control unit 120, an article detection unit 130, and an image analysis unit 140.

First, the article infeed control unit 110 allows a pallet loaded with multiple articles to be installed on a tipper, and controls the angle of the tipper so that the articles loaded into the pallet are fed into the conveyor unit of the tipper. Here, the article infeed control unit 110 may control the angle of the tipper so that the pallet and the tipper are tilted at the same speed and at the same angle.

The conveyor control unit 120 controls the driving of the conveyor unit in order to disperse the articles fed into the conveyor unit of the tipper. Here, the conveyor unit includes a transport conveyor belt and a plurality of tipper-use conveyor belts, and the conveyor control unit 120 sequentially drives the transport conveyor belt and the plurality of tipper-use conveyor belts.

Also, the conveyor control unit 120 controls the conveyor unit by periodically increasing or decreasing respective driving speeds of the transport conveyor belt and the tipper-use conveyor belts.

Here, the conveyor control unit 120 may drive the conveyor unit so that the respective maximum driving speeds of the transport conveyor belt and the plurality of tipper-use conveyor belts are different from each other. Also, the conveyor control unit 120 may control the conveyor unit so that the maximum driving speed of the transport conveyor belt is the highest and the maximum driving speed of the tipper-use conveyor belt that is farthest away from the transport conveyor belt is the lowest.

In addition, the conveyor control unit 120 may set the acceleration time points of the transport conveyor belt and the plurality of tipper-use conveyor belts to different values. Further, the conveyor control unit 120 may set the deceleration time points of the transport conveyor belt and the plurality of tipper-use conveyor belts to the same value.

The conveyor control unit 120 may drive the conveyor unit in conformity with both the differences between the operation start times of the transport conveyor belt and the plurality of tipper-use conveyor belts and the operating durations of the transport conveyor belt and the tipper-use conveyor belts. Here, the differences between the operation start times and the operating durations may be values that are set based on at least one of the sizes of the articles fed into the conveyor unit and the density of the articles.

Meanwhile, the article detection unit 130 detects the articles fed into the conveyor unit so as to control the driving of the conveyor unit. When the articles are detected by the article detection unit 130, the conveyor control unit 120 controls the conveyor unit based on information about the detected articles.

Finally, the image analysis unit 140 analyzes an image corresponding to the conveyor unit. Further, the image analysis unit 140 may calculate at least one of the sizes of the articles and the density of the articles based on the results of analysis of the image. Here, the sizes of the articles and the density of the articles, calculated by the image analysis unit 140, may be used when the conveyor control unit 120 controls the driving of the conveyor unit.

Figure 2:
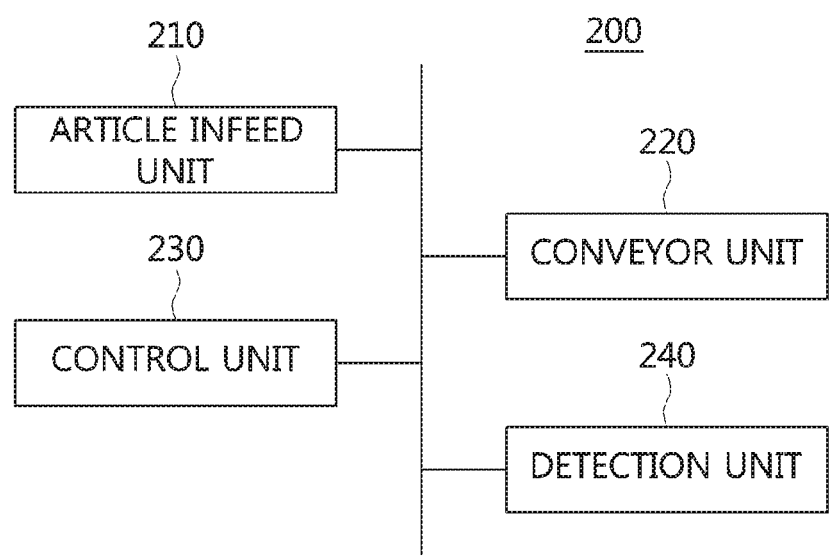
FIG. 2 is a block diagram showing the configuration of an automatic infeed tipper according to an embodiment of the present invention.

FIG. 2 is a block diagram showing the configuration of an automatic infeed tipper according to an embodiment of the present invention.

As shown in FIG. 2, an automatic infeed tipper 200 includes an article infeed unit 210, a conveyor unit 220, a control unit 230, and a detection unit 240.

First, the article infeed unit 210 allows a pallet loaded with multiple articles to be installed thereon, and rotates at the same angle as the pallet so that the articles loaded onto the pallet are fed into the automatic infeed tipper 200. Here, the rotation of the article infeed unit 210 means an operation of tilting the article infeed unit 210 so that the articles loaded onto the pallet are fed into the automatic infeed tipper 200.

The conveyor unit 220 includes a transport conveyor belt and a plurality of tipper-use conveyor belts. The conveyor unit 220 is configured to transport or separate articles by adjusting the spaces between the fed articles.

The control unit 230 controls the driving of the article infeed unit 210 and the conveyor unit 220. In this case, the control unit 230 may control the driving of the conveyor unit 220 by sequentially accelerating and decelerating the transport conveyor belt and the tipper-use conveyor belts.

The control unit 230 may control the conveyor unit 220 so that the respective maximum driving speeds of the transport conveyor belt and the plurality of tipper-use conveyor belts are different from each other. Further, the control unit 230 may control the conveyor unit 220 so that the acceleration time points of the transport conveyor belt and the tipper-use conveyor belts are different from each other and the deceleration time points thereof are identical to each other.

The detection unit 240 detects articles located in the conveyor unit. Further, the control unit 230 may control the driving of at least one of the article infeed unit 210 and the conveyor unit 220, based on the results of the detection by the detection unit 240.

Hereinafter, a method for controlling an automatic infeed tipper performed by the automatic infeed tipper control apparatus according to an embodiment of the present invention will be described in detail with reference to FIGS. 3 to 8.

Figure 3:
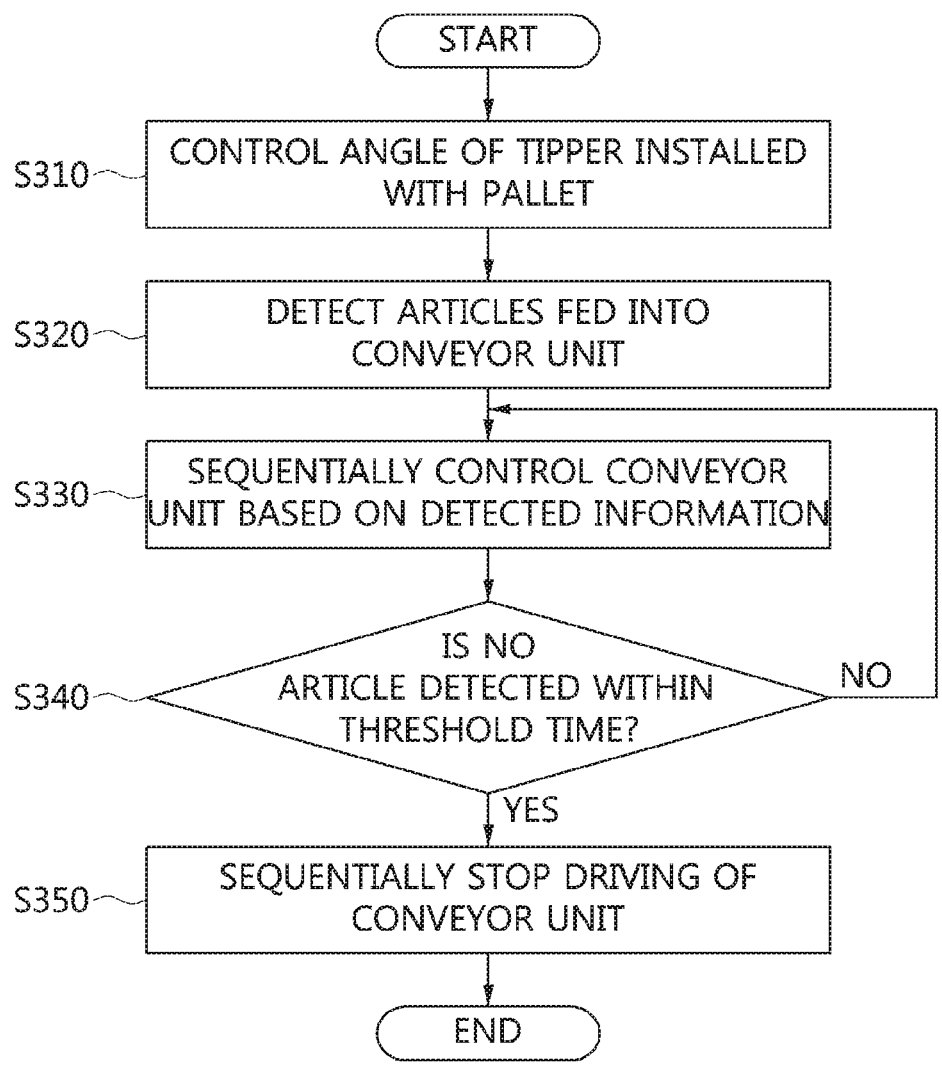
FIG. 3 is a flowchart for explaining a method for controlling an automatic infeed tipper, performed by the automatic infeed tipper control apparatus, according to an embodiment of the present invention.

FIG. 3 is a flowchart for explaining a method for controlling an automatic infeed tipper performed by the automatic infeed tipper control apparatus according to an embodiment of the present invention.

First, the automatic infeed tipper control apparatus 100 controls the angle of the tipper installed with a pallet at step S310.

The automatic infeed tipper control apparatus 100 allows a pallet loaded with multiple articles to be installed on the tipper. Here, the tipper may be a conventional tipper or an automatic infeed tipper.

Figure 4:
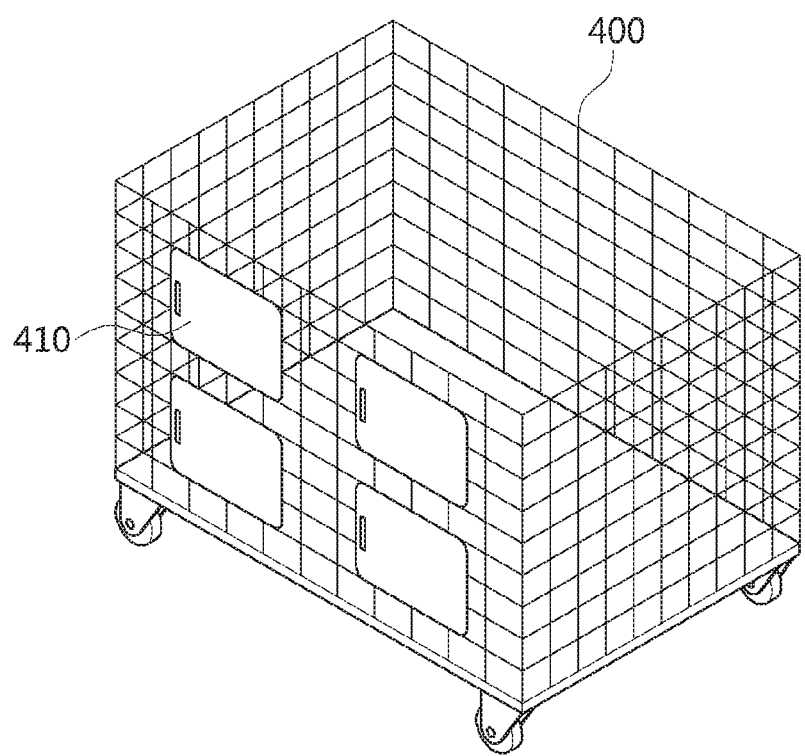
FIG. 4 is a diagram illustrating a pallet according to an embodiment of the present invention.

FIG. 4 is a diagram illustrating a pallet according to an embodiment of the present invention.

As shown in FIG. 4, a pallet 400 may be loaded with multiple articles and may be provided with wheels for facilitating transport. Further, the pallet 400 has pallet doors 410, which are configured to load articles onto the pallet 400 or feed the articles, loaded onto the pallet 400, into the tipper by opening and closing the pallet doors 410.

Figure 5:
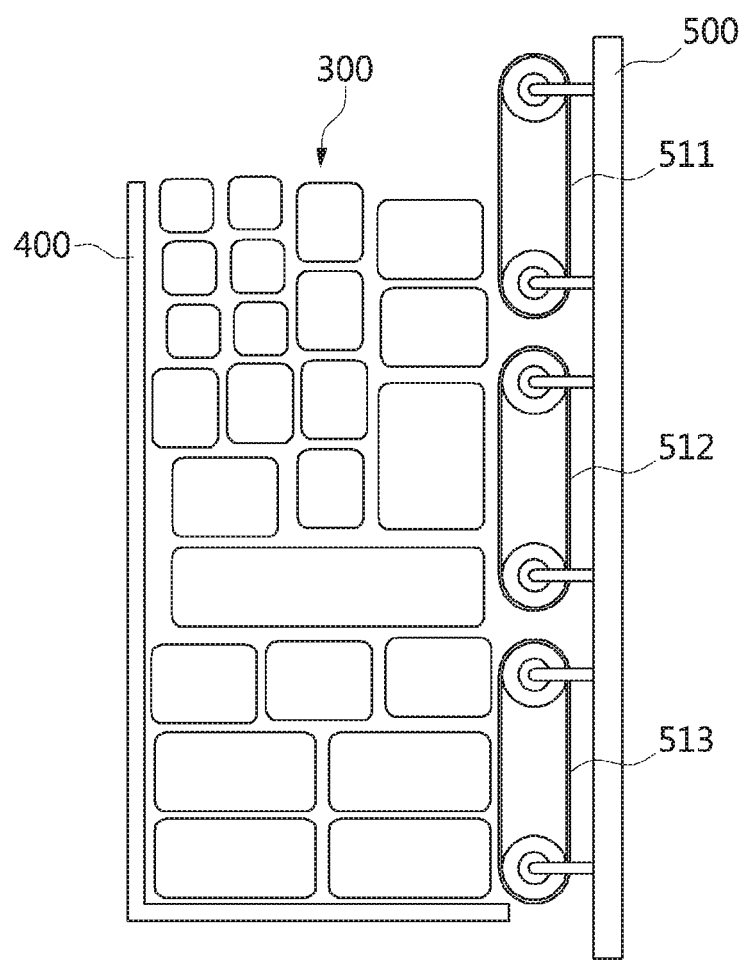
FIG. 5 is a diagram illustrating a tipper installed with a pallet according to an embodiment of the present invention.

FIG. 5 is a diagram illustrating a tipper on which the pallet is installed according to an embodiment of the present invention.

As shown in FIG. 5, the pallet 400 loaded with multiple articles 300 is installed on a tipper 500 with the doors of the pallet open.

The pallet 400 may be installed on the conveyor unit of the tipper 500, especially at the location corresponding to the tipper-use conveyor belts 511, 512, and 513 of the tipper 500.

In FIG. 5, although the tipper 500 is illustrated as having a total of three tipper-use conveyor belts 511, 512, and 513, the tipper 500 is not limited to this example, and may include a plurality of tipper-use conveyor belts.

Figure 6:
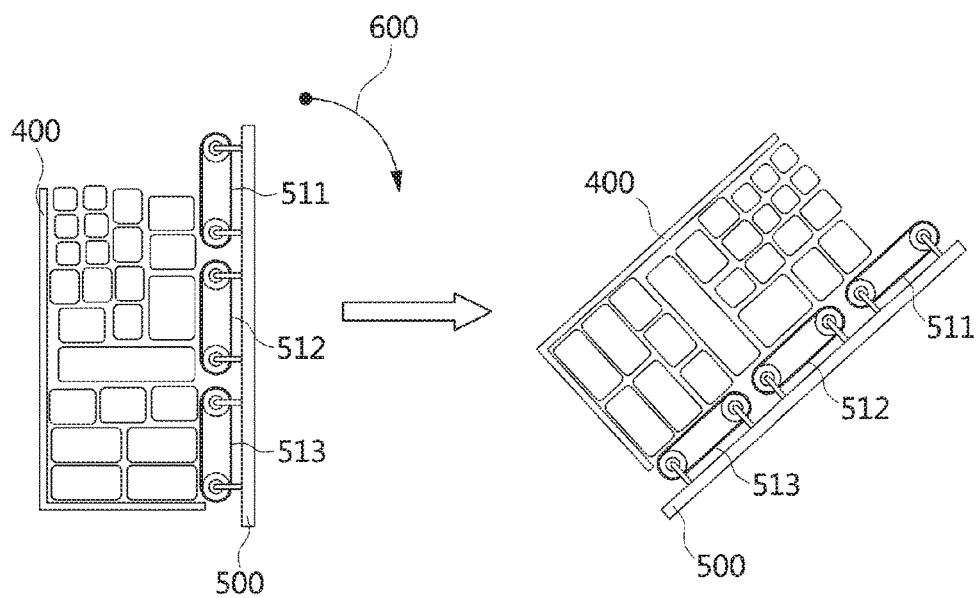
FIG. 6 is an exemplary diagram for explaining step S310 of FIG. 3.

FIG. 6 is an exemplary diagram for explaining step S310 of FIG. 3.

As shown in FIG. 6, the automatic infeed tipper control apparatus 100 controls the angle 600 of the tipper 500 on which the pallet 400 is installed. That is, the automatic infeed tipper control apparatus 100 tilts the tipper 500 and the pallet 400 installed on the tipper 500 at the same speed and at the same angle.

The automatic infeed tipper control apparatus 100 tilts the tipper 500 at the tipper angle 600 in the state in which the pallet 400 is installed on the tipper 500, in order to feed the articles loaded onto the pallet 400 into the tipper 500.

Here, the tipper angle 600 may be 60° to 90°, and may be set differently depending on various factors, such as the features of the work site, the purpose of the work site, and the characteristics of the articles loaded onto the pallet 400.

Further, the automatic infeed tipper control apparatus 100 detects the articles fed into the conveyor unit of the tipper at step S320.

The automatic infeed tipper control apparatus 100 detects whether there is any article fed into the conveyor unit of the tipper. Here, the automatic infeed tipper control apparatus 100 may detect, using a sensor, whether any article is present in the conveyor unit, the sensor not being limited to any specific type.

Further, the automatic infeed tipper control apparatus 100 may capture an image corresponding to the conveyor unit or may receive an image corresponding to the conveyor unit from outside the apparatus at step S320. Then, the automatic infeed tipper control apparatus 100 may analyze the acquired image and may calculate at least one of the sizes of articles located in the conveyor unit and the density of the articles.

Next, the automatic infeed tipper control apparatus 100 sequentially controls the conveyor unit based on information about the detected articles at step S330.

If any article fed into the conveyor unit is detected at step S320, the automatic infeed tipper control apparatus 100 drives the conveyor unit. Here, the automatic infeed tipper control apparatus 100 may first drive the transport conveyor belt and subsequently drive the plurality of tipper-use conveyor belts after a predetermined period of time has passed.

Figure 7:
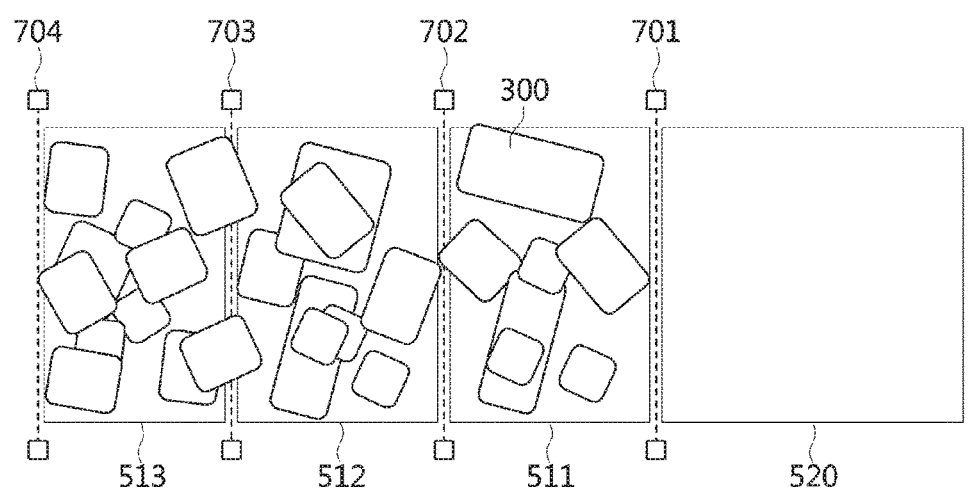
FIG. 7 is an exemplary diagram for explaining a method for controlling a conveyor at steps S320 and S330 of FIG. 3.

FIG. 7 is an exemplary diagram for explaining a method for controlling a conveyor at steps S320 and S330 of FIG. 3.

As shown in FIG. 7, the automatic infeed tipper control apparatus 100 sequentially drives a transport conveyor belt 520 and a plurality of tipper-use conveyor belts 511, 512, and 513 so as to prevent multiple articles fed into the tipper from being shifted all at the same time.

When the presence of articles is detected by first to third sensors 701 to 703, the automatic infeed tipper control apparatus 100 drives the transport conveyor belt 520 and the first tipper-use conveyor belt 511. Here, the automatic infeed tipper control apparatus 100 may first drive the transport conveyor belt 520 and subsequently drive the first tipper-use conveyor belt 511 after a predetermined period of time has passed.

Then, if the predetermined period of time has elapsed, or if it is determined that no article is detected by the first sensor 701, the automatic infeed tipper control apparatus 100 drives the second tipper-use conveyor belt 512. Until the predetermined period of time has passed or until it is determined that no article is detected by the second sensor 702 within a threshold time or longer, the automatic infeed tipper control apparatus 100 may drive the second tipper-use conveyor belt 512.

If the predetermined period of time has passed or if it is determined that no article is detected by the second sensor 702 within the threshold time or longer, the automatic infeed tipper control apparatus 100 drives the third tipper-use conveyor belt 513.

At step S330, the automatic infeed tipper control apparatus 100 may separate the multiple articles located in the conveyor unit in a stacked arrangement by increasing and decreasing the respective driving speeds of the transport conveyor belt 520 and the plurality of tipper-use conveyor belts 511, 512, and 513.

That is, the automatic infeed tipper control apparatus 100 controls the conveyor unit by periodically increasing and decreasing the respective driving speeds of the transport conveyor belt 520 and the plurality of tipper-use conveyor belts 511, 512 and 513 included in the conveyor unit.

Figure 8:
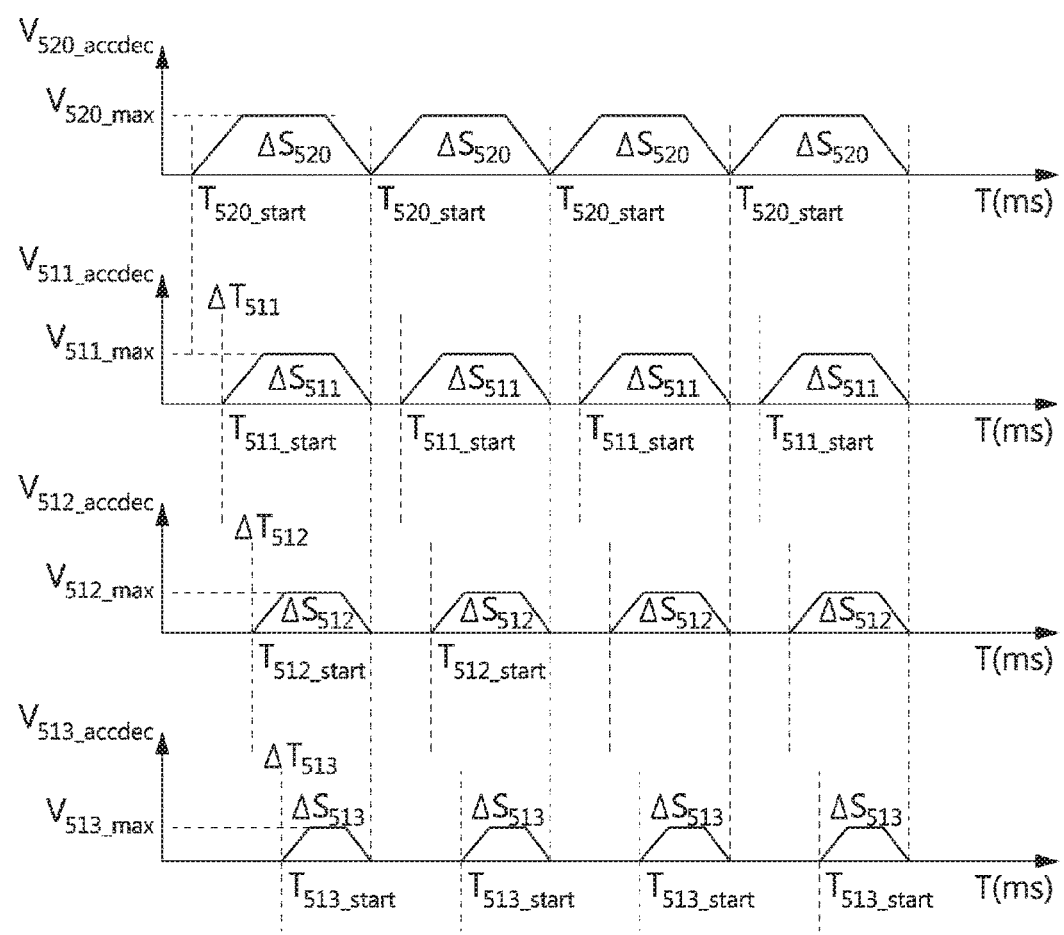
FIG. 8 is an exemplary diagram for explaining a method for controlling the acceleration and deceleration of respective conveyor belts according to an embodiment of the present invention.

FIG. 8 is an exemplary diagram for explaining a method for controlling the acceleration and deceleration of respective conveyor belts according to an embodiment of the present invention.

As shown in FIG. 8, the automatic infeed tipper control apparatus 100 may control the transport conveyor belt and the plurality of tipper-use conveyor belts so that the maximum driving speeds of the transport conveyor belt and the plurality of tipper-use conveyor belts are different from each other.

In particular, the automatic infeed tipper control apparatus 100 may set the maximum driving speed $V_{max}$ of the transport conveyor belt to the highest value and may set the maximum driving speeds $V_{max}$ of the tipper-use conveyor belts to lower values as the distance to the transport conveyor belt increases.

For example, it is assumed that the conveyor unit is provided with conveyor belts in the order of a transport conveyor belt, a first tipper-use conveyor belt, a second tipper-use conveyor belt, and a third tipper-use conveyor belt.

Here, the automatic infeed tipper control apparatus 100 may control the driving of the conveyor unit so that the maximum driving speeds of the conveyor belts satisfy the following relationship: the maximum driving speed of the transport conveyor belt $V_{520\_max}$>the maximum driving speed of the first tipper-use conveyor belt $V_{511\_max}$>the maximum driving speed of the second tipper-use conveyor belt $V_{512\_max}$>the maximum driving speed of the third tipper-use conveyor belt $V_{513\_max}$.

Further, as shown in FIG. 8, the automatic infeed tipper control apparatus 100 may control the driving of the conveyor unit so that respective acceleration time points $T_{Start}$ of the transport conveyor belt and the plurality of tipper-use conveyor belts are different from each other.

More specifically, the automatic infeed tipper control apparatus 100 may set the acceleration time point $T_{520\_Start}$ of the transport conveyor belt, the acceleration time point $T_{511\_Start}$ of the first tipper-use conveyor belt, the acceleration time point $T_{512\_Start}$ of the second tipper-use conveyor belt, and the acceleration time point $T_{513\_Start}$ of the third tipper-use conveyor belt to different values. By means of this, the automatic infeed tipper control apparatus 100 may widen the front and rear spaces between articles fed into the conveyor unit.

Further, the automatic infeed tipper control apparatus 100 may control the driving of the conveyor unit so that the respective deceleration time points of the transport conveyor belt and the plurality of tipper-use conveyor belts thereof are identical to each other.

More specifically, the automatic infeed tipper control apparatus 100 may set the deceleration time point of the transport conveyor belt, the deceleration time point of the first tipper-use conveyor belt, the deceleration time point of the second tipper-use conveyor belt, and the deceleration time point of the third tipper-use conveyor belt to the same value, thus preventing the occurrence of a phenomenon in which the spaces between the articles fed into the conveyor unit are narrowed.

When the automatic infeed tipper control apparatus 100 calculates at least one of the sizes of articles and the density of the articles by analyzing the image at step S320, the automatic infeed tipper control apparatus 100 may set the differences T between the operation start times of the conveyor unit and the operating durations S of the conveyor unit based on the at least one of the sizes of articles and the density of the articles.

Here, the differences T between the operation start times are the differences between the time points at which respective operations of the transport conveyor belt and the plurality of tipper-use conveyor belts are started, and the operating durations S are time periods during which the respective operations of the conveyor belts are maintained.

In this way, the automatic infeed tipper control apparatus 100 according to the embodiment of the present invention may set the differences T between the operation start times of the conveyor belts and the operating durations S of the conveyor belts so as to widen the spaces between articles and to separate articles which are superimposed in a stacked structure, and may control the driving of the conveyor unit based on the set differences T between the operation start times and the set operating durations S.

Referring back to FIG. 3, the automatic infeed tipper control apparatus 100 determines whether no article has been detected within a threshold time at step S340.

As a result of the detection of any article fed into the conveyor unit at step S320, the automatic infeed tipper control apparatus 100 determines whether any article has been detected within the threshold time.

Further, if any article has been detected within the threshold time, the automatic infeed tipper control apparatus 100 performs step S330. On the other hand, if no article is detected within the threshold time, the automatic infeed tipper control apparatus 100 sequentially stops the driving of the conveyor unit at step S350.

After the third tipper-use conveyor belt has been driven, if a predetermined time passes or if no article is detected by the third sensor 703 and the fourth sensor 704 within the threshold time or longer, the automatic infeed tipper control apparatus 100 stops the driving of the conveyor unit.

For the convenience of description, although the automatic infeed tipper control apparatus 100 has been described as performing a procedure from step S340 after performing step S330, the present invention is not limited to this example, and may perform step S330 and step S340 simultaneously.

That is, while controlling the conveyor unit by performing step S330, the automatic infeed tipper control apparatus 100 may detect each article fed into the conveyor unit by continuously or periodically performing step S320. Further, if the presence of any article in the conveyor unit is detected, the automatic infeed tipper control apparatus 100 performs step S330.

However, if it is determined that the presence of no article in the conveyor unit is detected within the threshold time, the automatic infeed tipper control apparatus 100 sequentially stops the driving of the conveyor belts in the conveyor unit at step S350. Here, the automatic infeed tipper control apparatus 100 may stop the driving of the conveyor belts in the reverse order of the driving order of the sequentially driven conveyor belts at step S330.

Assuming that the conveyor unit is driven in the order of the transport conveyor belt, the first tipper-use conveyor belt, the second tipper-use conveyor belt, and the third tipper-use conveyor belt at step S330, the automatic infeed tipper control apparatus 100 may stop the driving of the conveyor unit in the order of the third tipper-use conveyor belt, the second tipper-use conveyor belt, the first tipper-use conveyor belt, and the transport conveyor belt at step at step S350.

As described above with reference to FIGS. 3 to 8, the automatic infeed tipper control apparatus 100 according to the embodiment of the present invention sequentially drives the tipper composed of the transport conveyor belt and the plurality of tipper-use conveyor belts, and controls the acceleration and deceleration of respective conveyor belts. By means of this operation and control, the automatic infeed tipper control apparatus 100 according to the embodiment of the present invention may align articles without causing a bottleneck in a short infeed conveyor and a short singulator device.

Hereinafter, a method for operating an automatic infeed tipper according to an embodiment of the present invention will be described in detail with reference to FIG. 9.

Figure 9:
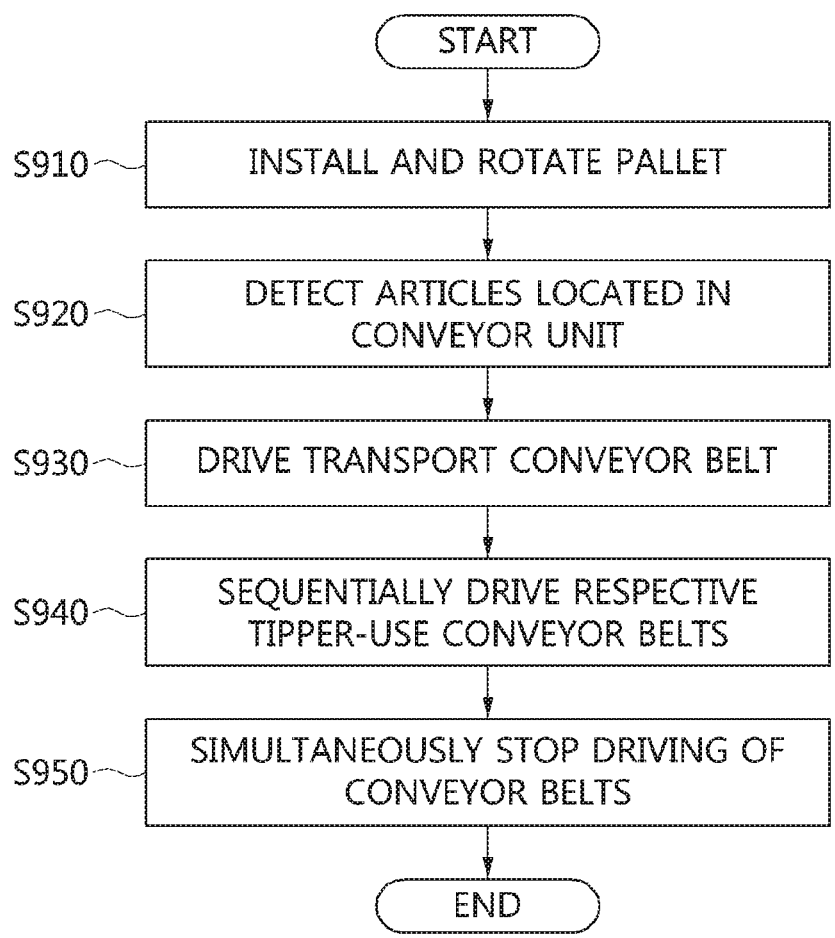
FIG. 9 is a flowchart for explaining a method for operating an automatic infeed tipper according to an embodiment of the present invention.

FIG. 9 is a flowchart for explaining a method for operating the automatic infeed tipper according to an embodiment of the present invention.

First, an automatic infeed tipper 200 allows a pallet to be installed thereon and rotates at the same angle and at the same speed as the pallet at step S910.

The automatic infeed tipper 200 allows the pallet loaded with multiple articles to be installed thereon, and then rotates at the same angle and at the same speed as the pallet, thus enabling the articles loaded onto the pallet to be fed into a conveyor unit.

Step S910, at which the automatic infeed tipper 200 feeds the articles loaded onto the pallet into the conveyor unit, is substantially identical to step S310, at which the automatic infeed tipper control apparatus 100 controls the angle of the tipper, and thus a repeated description thereof will be omitted.

Next, the automatic infeed tipper 200 detects articles located in the conveyor unit at step S920.

The automatic infeed tipper 200 detects articles fed into the conveyor unit using at least one of a sensor and an image-capturing device. Here, step S920, at which the automatic infeed tipper 200 detects articles, is substantially identical to step S320 of FIG. 3, and thus a repeated description thereof will be omitted.

Then, the automatic infeed tipper 200 drives the transport conveyor belt at step S930.

If it is detected that articles are located on the transport conveyor belt and the plurality of tipper-use conveyor belts, the automatic infeed tipper 200 drives the transport conveyor belt.

Further, the automatic infeed tipper 200 sequentially drives the respective tipper-use conveyor belts at step S940.

Here, the automatic infeed tipper 200 may sequentially drive the tipper-use conveyor belts from the tipper-use conveyor belts closer to the transport conveyor belt. Further, if it is determined that no article is detected by a sensor located between the conveyor belts within a threshold time, the automatic infeed tipper 200 may drive a conveyor belt corresponding to the sensor.

At steps S930 and S940, the automatic infeed tipper 200 may drive the conveyor belts in conformity with the maximum driving speeds and acceleration time points, which are differently set for respective conveyor belts. Further, the automatic infeed tipper 200 may drive the conveyor belts by setting the deceleration time points of all conveyor belts to the same value.

At steps S930 and S940, the procedure for driving the conveyor belts of the conveyor unit is substantially identical to step S330 of FIG. 3, and thus a repeated description thereof will be omitted.

Finally, the automatic infeed tipper 200 stops the driving of the conveyor belts simultaneously at step S950.

If a predetermined period of time has passed, or if no article is detected by the corresponding sensor within the threshold time or longer, the automatic infeed tipper 200 may simultaneously stop the driving of the conveyor belts.

The operations of the steps S930, S940 and S950 may be repeated periodically.

The procedure in which the automatic infeed tipper 200 stops the driving of the conveyor unit is substantially identical to step S350 of FIG. 3, and thus a repeated description thereof will be omitted.

In this way, the automatic infeed tipper 200 according to the embodiment of the present invention may receive a control signal from the automatic infeed tipper control apparatus 100 and control the driving of the conveyor unit, as shown in FIG. 3, or may detect articles and control the driving of the conveyor unit, as shown in FIG. 9, thus enabling articles to be sorted.

Figure 10:
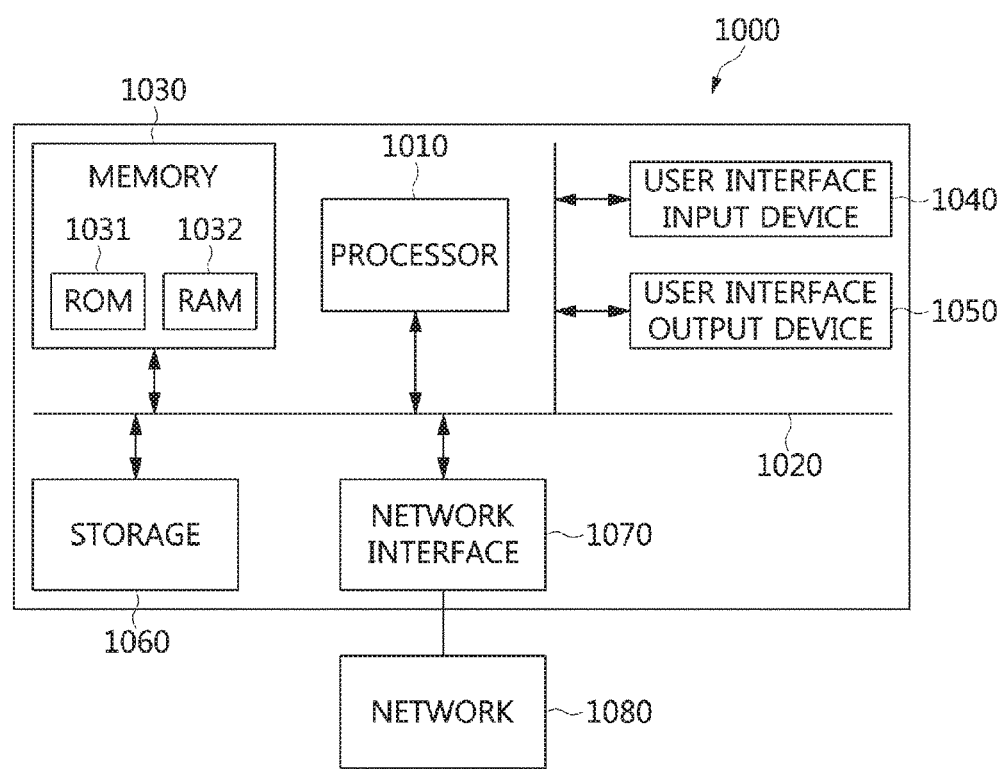
FIG. 10 is a block diagram showing a computer system according to an embodiment of the present invention.

FIG. 10 is a block diagram showing a computer system according to an embodiment of the present invention.

Referring to FIG. 10, the embodiment of the present invention may be implemented in a computer system 1000, such as a computer-readable storage medium. As shown in FIG. 10, the computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each of the processors 1010 may be a Central Processing Unit (CPU) or a semiconductor device for executing processing instructions stored in the memory 1030 or the storage 1060. Each of the memory 1030 and the storage 1060 may be any of various types of volatile or nonvolatile storage media. For example, the memory may include Read Only Memory (ROM) 1031 or Random Access Memory (RAM) 1032.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, an automatic infeed device may be applied to a logistics center having a small space.

Further, in accordance with the present invention, the workload imposed on a worker who conducts an infeed task may be reduced.

Furthermore, in accordance with the present invention, articles may be aligned without causing a bottleneck in a short infeed conveyor and a short singulator device.

As described above, in the automatic infeed tipper and the apparatus and method for controlling the automatic infeed tipper according to the present invention, the configurations and schemes in the above-described embodiments are not limitedly applied, and some or all of the above embodiments can be selectively combined and configured so that various modifications are possible.

What is claimed is:

1. An apparatus for controlling an automatic infeed tipper, comprising:
an article infeed control unit for allowing a pallet loaded with multiple articles to be installed on the automatic infeed tipper, and controlling an angle of the automatic infeed tipper so that the articles loaded onto the pallet are fed into a conveyor unit; and
a conveyor control unit for sequentially driving a transport conveyor belt and a plurality of tipper-use conveyor belts, which are provided in the conveyor unit, so as to disperse the articles fed into the conveyor unit,
wherein each of the respective tipper-use conveyor belts convey a plurality of articles.

2. The apparatus of claim 1, wherein the conveyor control unit periodically increases and decreases respective driving speeds of the transport conveyor belt and the plurality of tipper-use conveyor belts.

3. The apparatus of claim 2, wherein the conveyor control unit drives the conveyor unit so that respective maximum driving speeds of the transport conveyor belt and the plurality of tipper-use conveyor belts are different from each other.

4. The apparatus of claim 3, wherein the conveyor control unit drives the conveyor unit so that the maximum driving speed of the transport conveyor belt is highest and a maximum driving speed of a tipper-use conveyor belt that is farthest away from the transport conveyor belt is lowest.

5. The apparatus of claim 3, wherein the conveyor control unit sets acceleration time points of the transport conveyor belt and the plurality of tipper-use conveyor belts to different values.

6. The apparatus of claim 5, wherein the conveyor control unit sets deceleration time points of the transport conveyor belt and the plurality of tipper-use conveyor belts to an identical value.

7. The apparatus of claim 1, wherein the conveyor control unit drives the conveyor unit in conformity with both differences between operation start times of the transport conveyor belt and the plurality of tipper-use conveyor belts and operating durations of the transport conveyor belt and the plurality of tipper-use conveyor belts.

8. The apparatus of claim 7, wherein the differences between the operation start times and the operating durations are set based on at least one of sizes of the articles fed into the conveyor unit and a density of the articles.

9. The apparatus of claim 8, further comprising an image analysis unit for analyzing an image corresponding to the conveyor unit, wherein the sizes of the articles and the density of the articles are calculated based on results of analysis of the image.

10. The apparatus of claim 1, wherein the article infeed control unit controls the angle of the tipper so that the pallet and the tipper are tilted at an identical speed and at an identical angle.

11. The apparatus of claim 1, further comprising an article detection unit for detecting the articles fed into the conveyor unit so as to control driving of the conveyor unit.

12. A method for controlling an automatic infeed tipper, the method being performed by an apparatus for controlling the automatic infeed tipper, the method comprising:
installing a pallet loaded with multiple articles on the automatic infeed tipper, and controlling an angle of the automatic infeed tipper so that the articles loaded onto the pallet are fed into a conveyor unit;
sequentially driving a transport conveyor belt and a plurality of tipper-use conveyor belts, which are provided in the conveyor unit, so as to disperse the articles fed into the conveyor unit; and
stopping the driving of the conveyor unit in a reverse order of a driving order in which the conveyor belts in the conveyor unit are driven,
wherein each of the respective tipper-use conveyor belts convey a plurality of articles.

13. The method of claim 12, wherein sequentially driving the conveyor unit is configured to periodically increase and decrease respective driving speeds of the transport conveyor belt and the plurality of tipper-use conveyor belts.

14. The method of claim 13, wherein sequentially driving the conveyor unit is configured to drive the conveyor unit so that respective maximum driving speeds of the transport conveyor belt and the plurality of tipper-use conveyor belts are different from each other.

15. The method of claim 14, wherein sequentially driving the conveyor unit is configured to set acceleration time points of the transport conveyor belt and the plurality of tipper-use conveyor belts to different values and to set deceleration time points of the transport conveyor belt and the plurality of tipper-use conveyor belts to an identical value.

16. The method of claim 12, wherein sequentially driving the conveyor unit comprises:
receiving and analyzing an image corresponding to the conveyor unit;
setting differences between operation start times of the transport conveyor belt and the plurality of tipper-use conveyor belts and operating durations of the transport conveyor belt and the plurality of tipper-use conveyor belts, based on at least one of sizes of the articles fed into the conveyor unit and a density of the articles; and
driving the conveyor unit in conformity with the differences between the operation start times and the operating durations.

17. An automatic infeed tipper, comprising:
an article infeed unit configured to allow a pallet loaded with multiple articles to be installed thereon and to rotate at an angle identical to an angle of the pallet so that the articles, loaded onto the pallet, are fed into the article infeed unit;
a conveyor unit provided with a transport conveyor belt and a plurality of tipper-use conveyor belts, and configured to transport the articles by adjusting spaces between fed articles; and
a control unit configured to control driving of the article infeed unit and control driving of the conveyor unit by sequentially accelerating and decelerating the transport conveyor belt and the plurality of tipper-use conveyor belts,
wherein each of the respective tipper-use conveyor belts convey a plurality of articles.

18. The automatic infeed tipper of claim 17, further comprising a detection unit configured to detect the articles located in the conveyor unit,
wherein the control unit controls driving of at least one of the article infeed unit and the conveyor unit based on results of detection by the detection unit.

19. The automatic infeed tipper of claim 17, wherein the control unit controls the conveyor unit so that respective maximum driving speeds of the transport conveyor belt and the plurality of tipper-use conveyor belts are different from each other.

20. The automatic infeed tipper of claim 17, wherein the control unit controls the conveyor unit so that respective acceleration time points of the transport conveyor belt and the plurality of tipper-use conveyor belts are different from each other and respective deceleration time points of the transport conveyor belt and the plurality of tipper-use conveyor belts are identical to each other.

* * * * *